United States Patent
Ojiro et al.

(10) Patent No.: US 8,550,154 B2
(45) Date of Patent: Oct. 8, 2013

(54) RESIN HEAT EXCHANGER UNIT, METHOD FOR MANUFACTURING THE RESIN HEAT EXCHANGER UNIT, AND HEAT EXCHANGER

(75) Inventors: Minoru Ojiro, Ota (JP); Yaushiko Hata, Ota (JP); Hiroyuki Minezaki, Ota (JP); Tomoyoshi Sakamoto, Ota (JP); Hiroki Katagiri, Ota (JP)

(73) Assignee: RP Topla Limited, Suita-Shi (JP)

( * ) Notice: Subject to any disclaimer, the term of this patent is extended or adjusted under 35 U.S.C. 154(b) by 661 days.

(21) Appl. No.: 12/742,042

(22) PCT Filed: Mar. 13, 2009

(86) PCT No.: PCT/JP2009/054878
§ 371 (c)(1),
(2), (4) Date: May 7, 2010

(87) PCT Pub. No.: WO2009/142055
PCT Pub. Date: Nov. 26, 2009

(65) Prior Publication Data
US 2010/0276133 A1    Nov. 4, 2010

(30) Foreign Application Priority Data

May 21, 2008    (JP) .................................. 2008-132990

(51) Int. Cl.
*F28F 3/12*    (2006.01)
*B29C 49/06*    (2006.01)

(52) U.S. Cl.
USPC ............ 165/170; 165/181; 264/520; 264/564

(58) Field of Classification Search
USPC ........ 165/177, 179, 182; 29/890.03, 890.046, 29/890.05; 264/632, 635, 512, 513, 514, 264/515, 516, 520, 523, 564, 565, 531
See application file for complete search history.

(56) References Cited

U.S. PATENT DOCUMENTS

| 4,132,264 A | * | 1/1979 | Furlong ........................ 165/179 |
| 4,926,933 A | * | 5/1990 | Gray .............................. 165/173 |
| 5,948,343 A | * | 9/1999 | Hiroki et al. .................. 264/503 |
| 2002/0088526 A1 | * | 7/2002 | Lee .............................. 156/73.1 |

(Continued)

FOREIGN PATENT DOCUMENTS

| JP | 58-75584 U | 6/1981 |
| JP | 57-183494 U | 11/1982 |

(Continued)

OTHER PUBLICATIONS

Office Action for corresponding Japanese Patent Application No. 2008-132990, dated Dec. 11, 2012.

(Continued)

*Primary Examiner* — Tho V Duong
(74) *Attorney, Agent, or Firm* — Birch, Stewart, Kolasch & Birch, LLP

(57) ABSTRACT

In a resin heat exchanger unit, a resin pipe having straight portions and curved portions and a plurality of resin fins are integrally molded and there can be realized high reliability, high heat exchange efficiency, and a simple manufacturing process.
The resin heat exchanger unit includes a resin pipe (1), which has straight portions (2) and curved portions (3) provided alternatively and continuously, and a plurality of resin fins (4) connected to the pipe (1), the pipe (1) and the fins (4) being integrally injection-molded.

7 Claims, 11 Drawing Sheets

(56) References Cited

U.S. PATENT DOCUMENTS

| | | | |
|---|---|---|---|
| 2003/0024120 A1* | 2/2003 | Adams et al. | 29/890.03 |
| 2004/0058030 A1* | 3/2004 | Romanski et al. | 425/547 |
| 2005/0274504 A1 | 12/2005 | Torigoe | |
| 2006/0168812 A1* | 8/2006 | Insalaco | 29/890.05 |

FOREIGN PATENT DOCUMENTS

| | | |
|---|---|---|
| JP | 61-11594 A | 1/1986 |
| JP | 2002-225138 A | 8/2002 |
| JP | 3488470 B2 | 1/2004 |
| JP | 2004-108644 A | 4/2004 |
| JP | 2004-226056 A | 8/2004 |
| JP | 2006-200816 A | 8/2006 |
| WO | WO 97/28953 A1 | 8/1997 |

OTHER PUBLICATIONS

International Search Report-PCT/JP2008/054878 dated Jun. 2, 2009.

* cited by examiner (a)

(b)

(c)

(a)

(b)

(c)

(a)

(b)

(c)

(a)

(b)

(c)

RESIN HEAT EXCHANGER UNIT, METHOD FOR MANUFACTURING THE RESIN HEAT EXCHANGER UNIT, AND HEAT EXCHANGER

TECHNICAL FIELD

The present invention relates to a heat exchanger, and, more particularly, to a resin heat exchanger unit, in which a pipe and fins for increasing heat exchange efficiency are integrally molded, and a heat exchanger using the resin heat exchanger unit.

BACKGROUND ART

In the prior art, there has been used a heat exchanger in which metal fins are joined with a metal tube or pipe by welding or the like, and the joined fins and metal tube or pipe are integrated with a header tank by caulking or the like. Recently, in order to reduce the impact on the global environment, there is a growing need for improvement of fuel efficiency owing to lightening of a vehicle, such as an automobile. Also in the fields of household appliances and OA, the reduction in size and weight is strongly desired. In response to those needs, there have been intensified tendencies to substitute materials or optimize shapes for the prior art heat exchanger. Specifically, there has been proposed an all-resin heat exchanger in which all components are resinified. The resinified components can realize the extension of the degree of freedom of the shape, and it is considered that if the heat exchange efficiency can be ensured, it is very advantageous in terms of reduction of weight and size of the entire apparatus.

As an example of a resin heat exchanger, Patent Document 1 discloses a technique that a plurality of resin tubes having a single refrigerant circulation hole are individually set in a mold so as to penetrate through a cavity, and the tubes set in the mold are injection-molded, whereby the resin tubes and a seat plate are connected to each other. Patent document 2 discloses a technique that a plurality of flat perforated tubes having a plurality of refrigerant circulation holes are each set in a mold in the same manner as for Patent Document 1, and a resin material is injected, whereby the tubes and a seat plate are integrally molded.

Patent Document 3 discloses a technique that grooved sheets formed of a resin are joined so as to face each other, whereby a tube having a refrigerant passage is formed, and, at the same time, tanks are formed at the both ends.

The resin heat exchanger disclosed in Patent Document 4 has components each formed of a resin material, and plates (headers of tubes) formed by double injection are provided at the both front ends of the tubes, and a header tank is joined with the plate.

[Patent Document 1] Japanese Patent No. 3488470
[Patent Document 2] Japanese Patent Application Laid-Open No.
[Patent Document 3] Japanese Patent Application Laid-Open No. 2004-108644
[Patent Document 4] Japanese Patent Application Laid-Open No. 2002-225138

DISCLOSURE OF THE INVENTION

Problems to be Solved by the Invention

However, in the methods disclosed in Patent Documents 1 and 2, previously prepared straight tubes or sets of a plurality of tubes are inserted in different molds to be joined by thermal fusion bonding. However, the process is complex and lack of reliability.

In the method disclosed in Patent Document 3, two sheets are previously molded, and they are joined with each other. However, since they are joined with an adhesive, the process is complex, and, at the same time, the joint lacks the reliability. In the method disclosed in Patent Document 4, a molded body including straight tubes and fins is previously molded, and the molded body is joined with the headers of tubes by thermal fusion bonding. However, the process is complex, and the joint lacks reliability. In Patent Document 4, although the fins are also provided at the tube, the fin serves as a joint between the two straight tubes, and therefore, the heat exchange efficiency of the heat exchanger is not satisfactorily effective.

As a metal heat exchanger, there has been well-known one in which a plurality of fins are provided at a pipe or a tube having integrated straight portions and curved portions. However, also in this metal heat exchanger, the fins and the pipe or tube are joined by a separate process, for example, by welding.

Regardless of the material, there has not been known so far a heat exchanger in which a large number of fins, straight portions, and curved portions are integrally constituted as a heat exchanger unit.

Thus, it is an object of the present invention to provide a resin heat exchanger unit, in which a resin pipe having straight portions and curved portions and resin fins are integrally molded and there can be realized high reliability, high heat exchange efficiency, and a simple manufacturing process, and a heat exchanger using the resin heat exchanger unit.

Means for Solving the Problems

The resin heat exchanger unit of the present invention is characterized by including a resin pipe and a plurality of resin fins integrally injection-molded together, the resin pipe having straight portions and curved portions provided alternatively and continuously, and the resin fins being connected to the pipe.

The heat exchanger of the invention is characterized in that a plurality of the resin heat exchanger units are joined through a header tank.

A method for manufacturing a resin heat exchanger unit, according to the invention is characterized by including injecting a molten resin into a pipe cavity of a mold, the pipe cavity having on its one end a pressure port provided with a floating core and on its other end an outlet, pressure-injecting a pressurized fluid through the pressure port after the injection of the molten resin, and moving the floating core to the outlet side, and, at the same time, extruding the molten resin from the outlet.

Effects of the Invention

The present invention can provide at low cost a resin heat exchanger unit, which is highly reliable and has high heat exchange efficiency, and a heat exchanger using the resin heat exchanger unit.

DESCRIPTION OF REFERENCE NUMERALS

Figure 1:
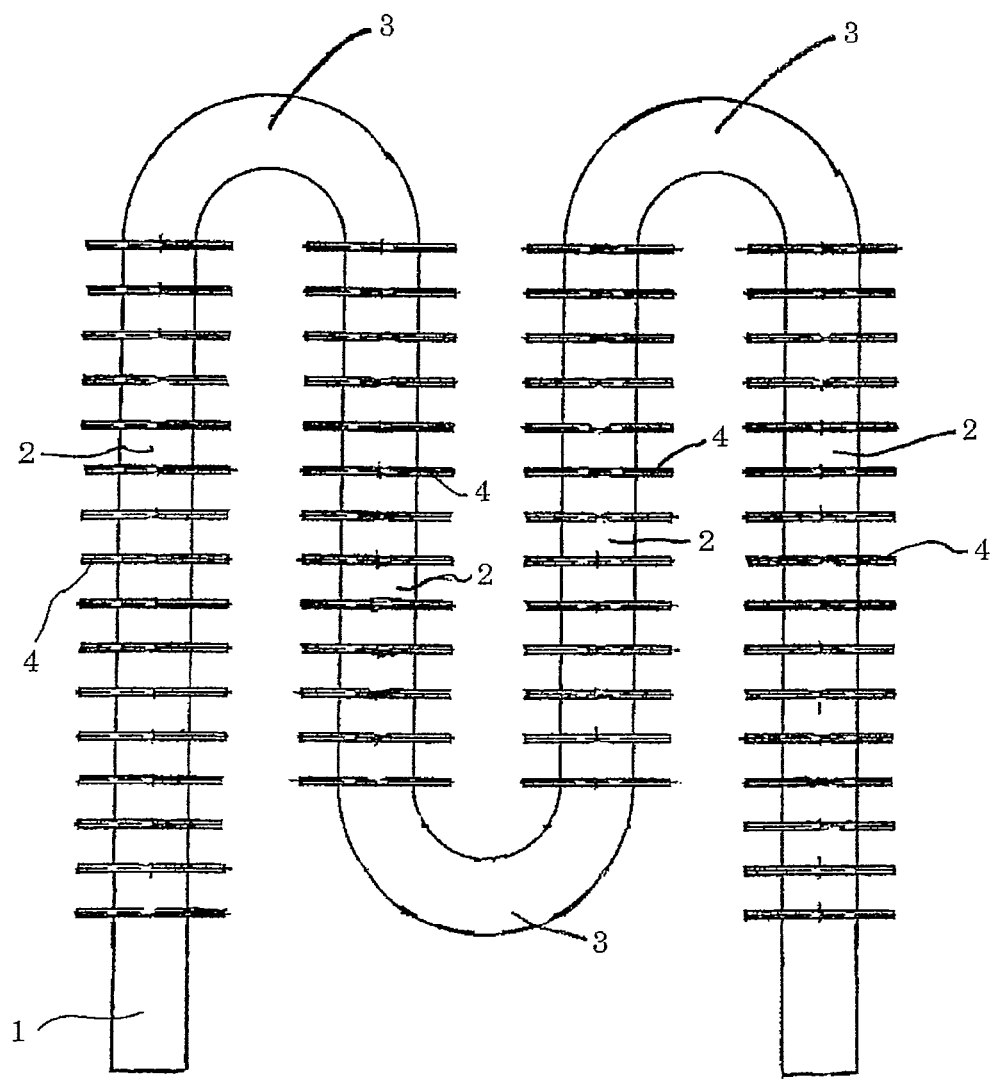
FIG. 1 is a front view showing an example of a resin heat exchanger unit of the present invention.

1 Pipe
1' Cavity
2 Straight portion
2' Straight portion cavity
3 Curved portion
3' Curved portion cavity
4 Fin
4 Fin cavity
5 Floating core
6 Pressure port
7 One end of cavity
8 The other end of cavity
9 Communicating port
10 Excess resin storage cavity
11 Hollow
12 Connection portion
13 Outer frame
100 Resin heat exchanger unit
101 Header tank

BEST MODE FOR CARRYING OUT THE INVENTION

Hereinafter, the present invention will be described in detail with reference to the drawings.

Figure 2:
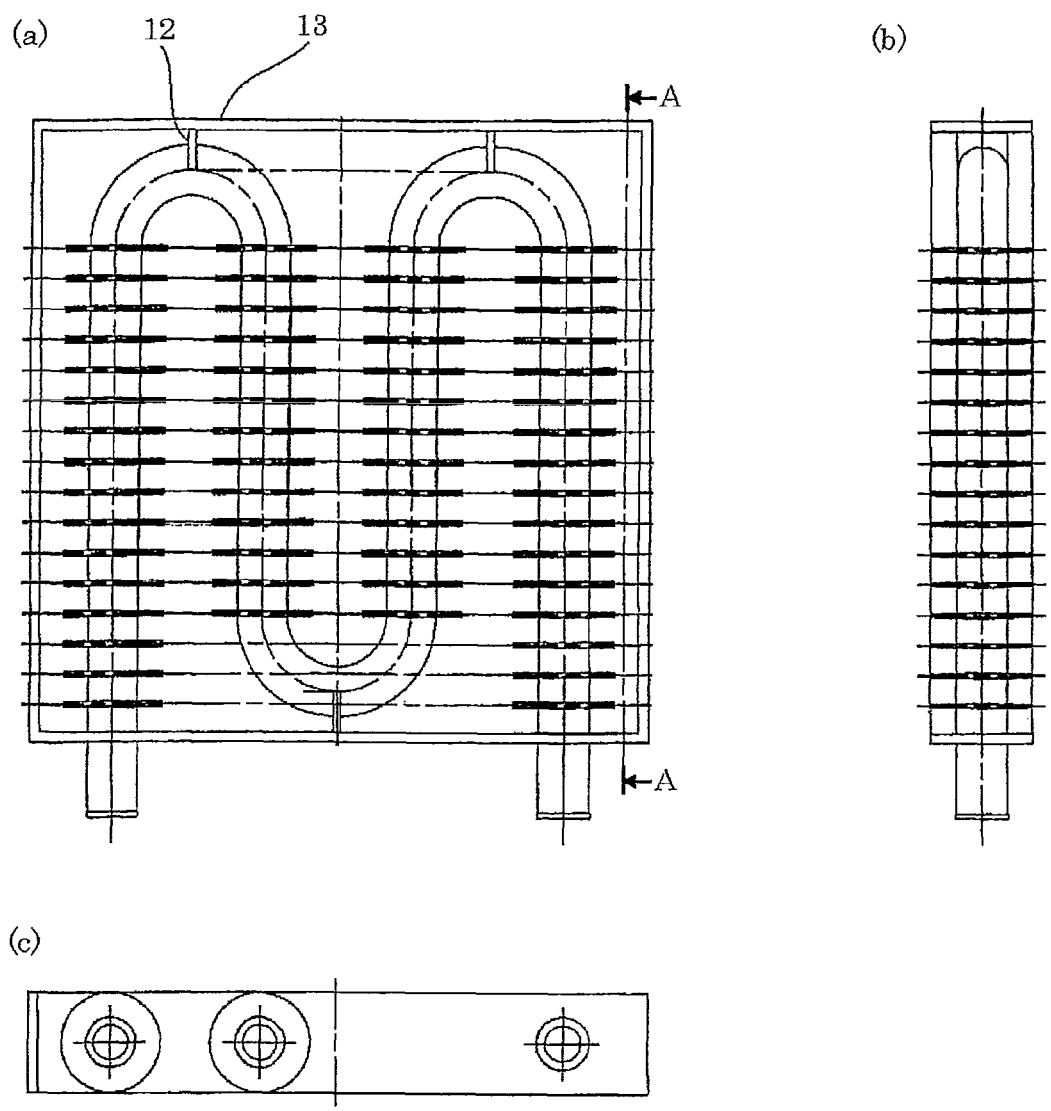
FIG. 2 is a view showing another example of the resin heat exchanger unit.

FIG. 1 is a front view showing an example of a resin heat exchanger unit of the present invention. FIG. 2 is a view showing another example of the resin heat exchanger unit of the present invention. FIG. 2A is a front view of the resin heat exchanger unit. FIG. 2B is an A-A cross-sectional view of the resin heat exchanger unit. The left half of FIG. 2C is a partial cross-sectional view of the resin heat exchanger unit, and the right half of FIG. 2C is a partial bottom view thereof.

The resin heat exchanger unit shown in FIG. 1 includes a resin pipe 1 and a plurality of resin fins 4 integrally injection-molded. The pipe 1 has straight portions 2 and curved portions 3 provided alternatively and continuously. The resin fins 4 are connected to the pipe 1. The resin heat exchanger unit shown in FIG. 2 further includes an outer frame 13 having connection portions 12 through which the outer frame 13 and the pipe 1 are connected to each other. The pipe 1 and the outer frame 13 are integrally injection-molded.

The resin heat exchanger unit shown in FIGS. 1 and 2 has the disk-shaped fins 4 at the straight portions 2 of the pipe 1 so that the fins 4 are perpendicular to the axial direction of the straight portion 2. Since those components are integrally injection-molded, there is no welded portion or joint between the pipe 1 and the fins 4 and between the pipe 1 and the outer frame 13.

The average thickness of the fin 4 is preferably not less than Tp/20 (Tp is the average thickness of the pipe 1) in terms of intensity, and it is preferably not more than Tp in terms of heat exchange efficiency and ensuring the smoothness of the inner surface of the pipe. When the average thickness of the fin 4 is less than Tp/20, there may occur intensity problems that, for example, the fin 4 is easily broken. Meanwhile, when the average thickness of the fin 4 is more than Tp, the heat exchange efficiency may be reduced, or the effect of weight reduction due to resinification may be reduced. When the portion of the fin 4 in contact with the pipe 1 has a thickness of more than Tp, the inner surface of the pipe 1 may be rendered uneven by shrinkage of resin upon molding, whereby there may occur problems that, for example, the unevenness disturbs the flow of a fluid used as a heat exchange medium and passing through the pipe 1 or causes noises.

The thickness of the front end of the fin 4 is preferably not less than Tr/10 and not more than Tr (Tr is the thickness of the portion of the fin 4 in contact with the pipe 1). When the thickness of the front end of the fin 4 is less than Tr/10, there may cause intensity problems that, for example, the front end of the fin 4 is easily chipped. Meanwhile, when the thickness of the front end of the fin 4 is more than Tr, the moldability may be reduced such as deterioration of separation performance from a mold upon injection-molding, whereby the heat exchange efficiency may be reduced.

The greater the number of the fins 4, the better in terms of the heat exchange efficiency. However, the number of the fins 4 is preferably approximately 2 to 30 fins per 1 cm length of the pipe 1, and particularly approximately 3 to 20 fins. When the number of the fins 4 is less than 2, the expected heat exchange efficiency may not be obtained. Meanwhile, when the number of the fins 4 is more than 30, there may occur an inconvenience in the separation performance from a mold in the injection-molding, a molten resin may not be satisfactorily filled in the fins 4 due to the significant reduction of the thickness of the fins 4, or the intensity of the fin 40 may be reduced.

The fin 4 is not limited to the one perpendicular to the axial direction of the straight portion 2 of the pipe 1, and the fins 4 may be provided in parallel or diagonally relative to the axial direction of the straight portion 2 of the pipe 1. However, in terms of the heat exchange efficiency and the injection moldability, it is preferable that the fin 4 is perpendicular to the axial direction of the straight portion 2 of the pipe 1. The shape of the fin 4 is not limited to a disk shape, and may be suitably set according to the design conditions of a heat exchanger. Specifically, the fins as shown in FIGS. 3 to 7 are used. In FIGS. 3 to 7, (a) is a front view of the resin heat exchanger unit, and (b) is an A-A cross-sectional view thereof. The left half of (c) is a partial cross sectional view of the resin heat exchanger unit, and the right half is a partial bottom view thereof.

Figure 3:
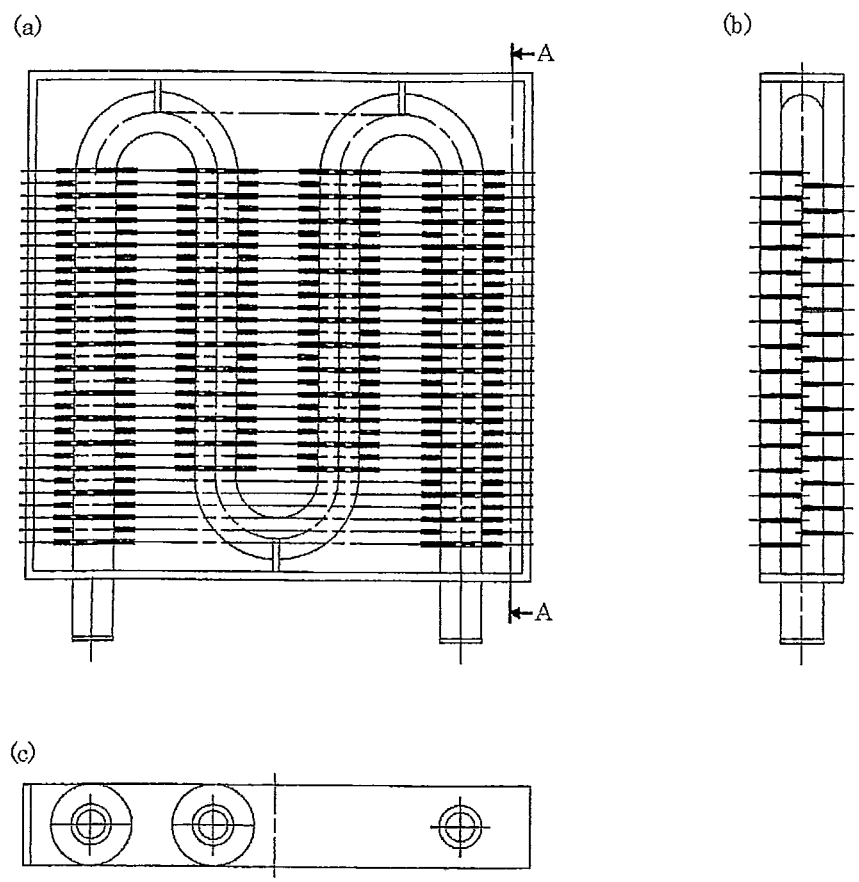
FIG. 3 is a view showing a still another example of the resin heat exchanger unit.
Figure 4:
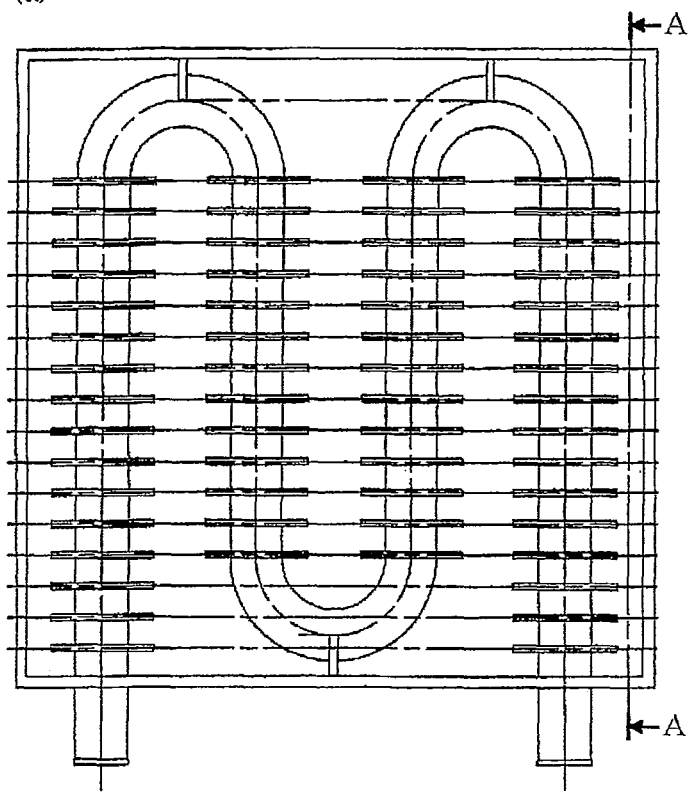
FIG. 4 is a view showing a yet another example of the resin heat exchanger unit.
Figure 4:
Figure 4:
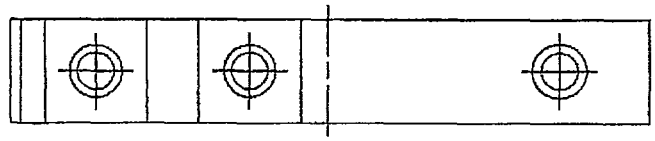
Figure 5:
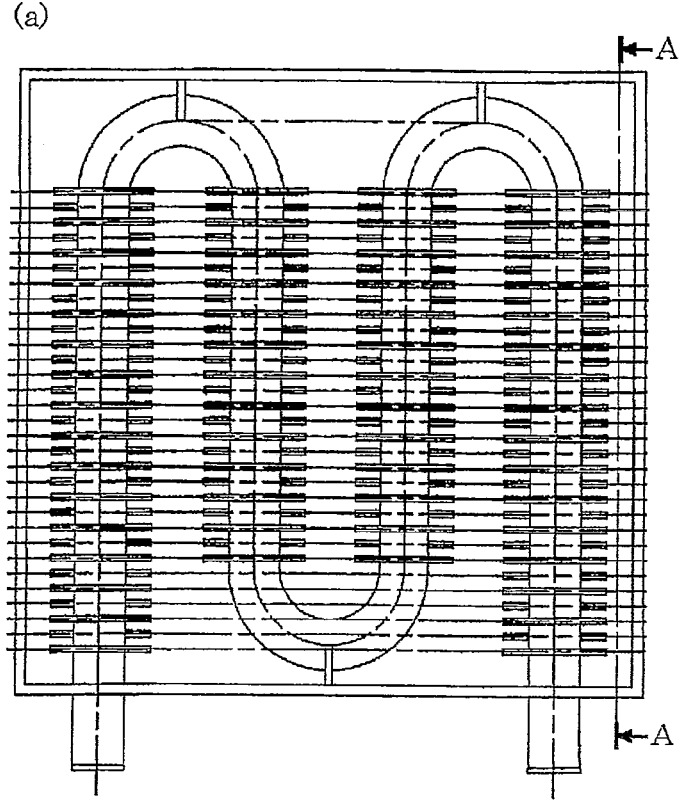
FIG. 5 is a view showing a further example of the resin heat exchanger unit.
Figure 5:
Figure 5:
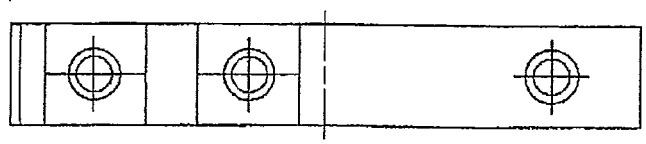
Figure 6:
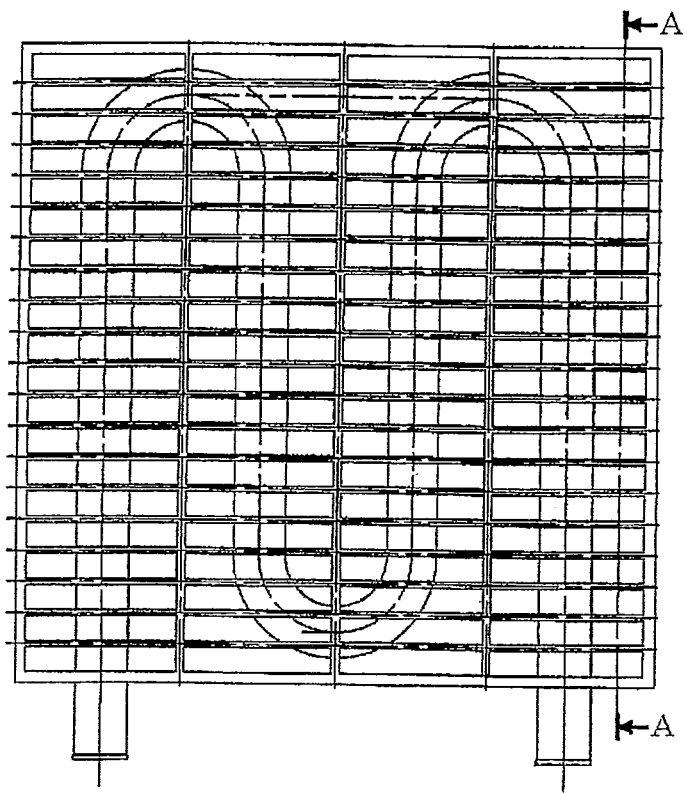
FIG. 6 is a view showing a still further example of the resin heat exchanger unit.
Figure 6:
Figure 6:
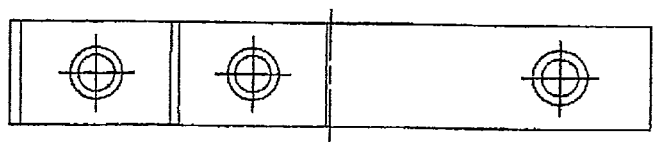
Figure 7:
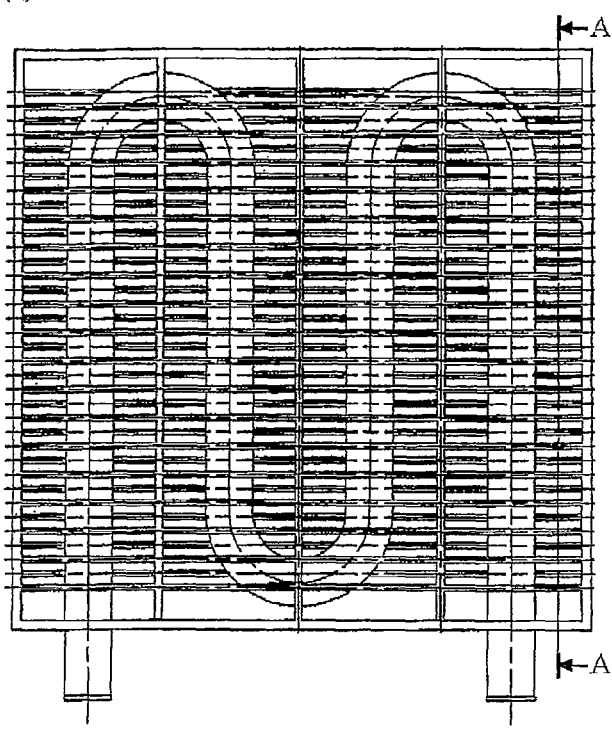
FIG. 7 is a view showing a yet still further example of the resin heat exchanger unit.
Figure 7:
Figure 7:
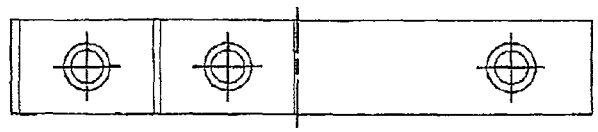

The example shown in FIG. 3 is similar to FIG. 2 except that half-disk shaped fins are alternately provided. The example shown in FIG. 4 is similar to FIG. 2 except that each of the fins has a square-plate shape. The example shown in FIG. 5 is similar to FIG. 2 except that square-plate shaped fins are alternately provided. The example shown in FIG. 6 is similar to FIG. 2 except that fins have square-plate shapes connecting the opposed sides of the outer frame to each other, and similar fins parallel to the axial direction of the straight portions of the pipe are respectively provided at the tops of the curved portions of the pipe. The example shown in FIG. 7 is similar to FIG. 6 except that fins perpendicular to the axial direction of the straight portions of the pipe are alternatively provided.

Although the resin used in the present invention includes any thermoplastic resin and thermosetting resin that enable injection-molding of a hollow body, the thermoplastic resin is preferably used in terms of hollow moldability in the injection-molding. The thermoplastic resin includes various resins, for example, polystyrene, a polystyrene-based resin such as AS and ABS, a polyolefin-based resin such as polypropylene and polyethylene, a polyamide-based resin such as nylon 66 or nylon 6, a polyester-based resin such as PET and PBT, POM, polycarbonate, PPS, modified PPE, a PMMA resin, and a polyvinyl chloride resin. Further, there may be used those thermoplastic resins containing a reinforcing material, such as glass fiber, talc, calcium carbonate, or kaolin, or an inorganic filler. If the thermosetting resin is an injection moldable resin that is known as BCM such as unsaturated polyester resin and phenol resin, it can be used in the present invention.

Figure 8:
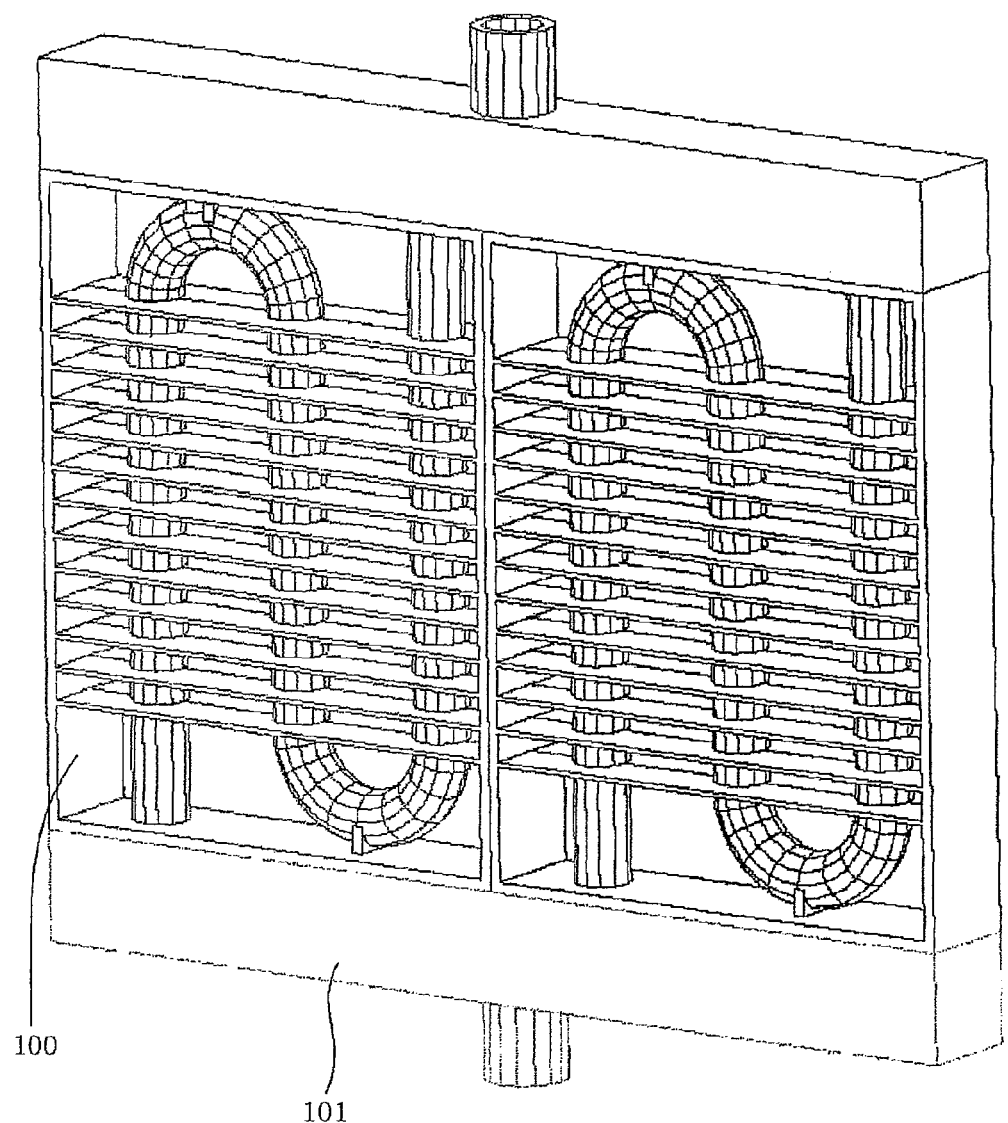
FIG. 8 is a view showing an example of a heat exchanger of the present invention.

The resin heat exchanger unit of the present invention can be used alone; however, as shown in FIG. 8, when a plurality of resin heat exchanger units 100 are joined through a header tank 101 and used as a heat exchanger, it can contribute to, for example, the size increase, simplification of maintenance, and enhancement of the degree of freedom of the shape. The resin heat exchanger unit 100 and the header tank 101 can be joined together by sealable well-known techniques such as thermal fusion bonding, mechanical caulking, and using an adhesive.

In the heat exchanger of the present invention, hot water is flowed from one side of a pipe, and cold air is sent to fins by a fan or the like, whereby the temperature of the hot water can be lowered. The heat exchange efficiency can be arbitrarily designed by, for example, the number of the resin materials and the fins used in the heat exchanger, the thickness of the fin, the diameter of the pipe or the length from the pipe to the fin, and the number of the resin heat exchanger units. Further, the heat exchanger of the invention has advantages, for example, that compared with the conventional metal heat exchanger, the weight and cost can be further reduced, and, at the same time, a space area can be reduced due to the degree of freedom of the design. Furthermore, relative to the conventional resin heat exchanger, the heat exchanger of the present invention uses the units with integrally molded components important for a heat exchanger, such as a pipe and fins, and therefore, a post-process such as welding or deposition is not required. Thus, the present invention can realize a resin heat exchanger with high reliability, high heat exchange efficiency, and low manufacturing cost.

Next, a method for manufacturing a resin heat exchanger unit of the present invention will be described.

The resin heat exchanger unit of the present invention is manufactured by, for example, gas-assist injection molding (for example, Japanese Patent Application Publication No. 57-14968), water-assist injection molding (for example, plastic age (September 2007, page 106)), and a method using a floating core (for example, Japanese Patent Application Publication No. 7-20646). In order to maintain uniformity of the inside diameter of the pipe over the entire area of the pipe, the injection-molding method using a floating core is preferably used. A more preferable injection-molding method includes injecting a molten resin into a pipe cavity of a mold, the pipe cavity having on its one end a pressure port provided with a floating core and on its other end an outlet, pressure-injecting a pressurized fluid through the pressure port after the injection of the molten resin, and moving the floating core to the outlet side, and, at the same time, extruding the molten resin from the outlet.

Hereinafter, a method for manufacturing the resin heat exchanger unit of FIG. 1 using a floating core will be described.

Figure 9:
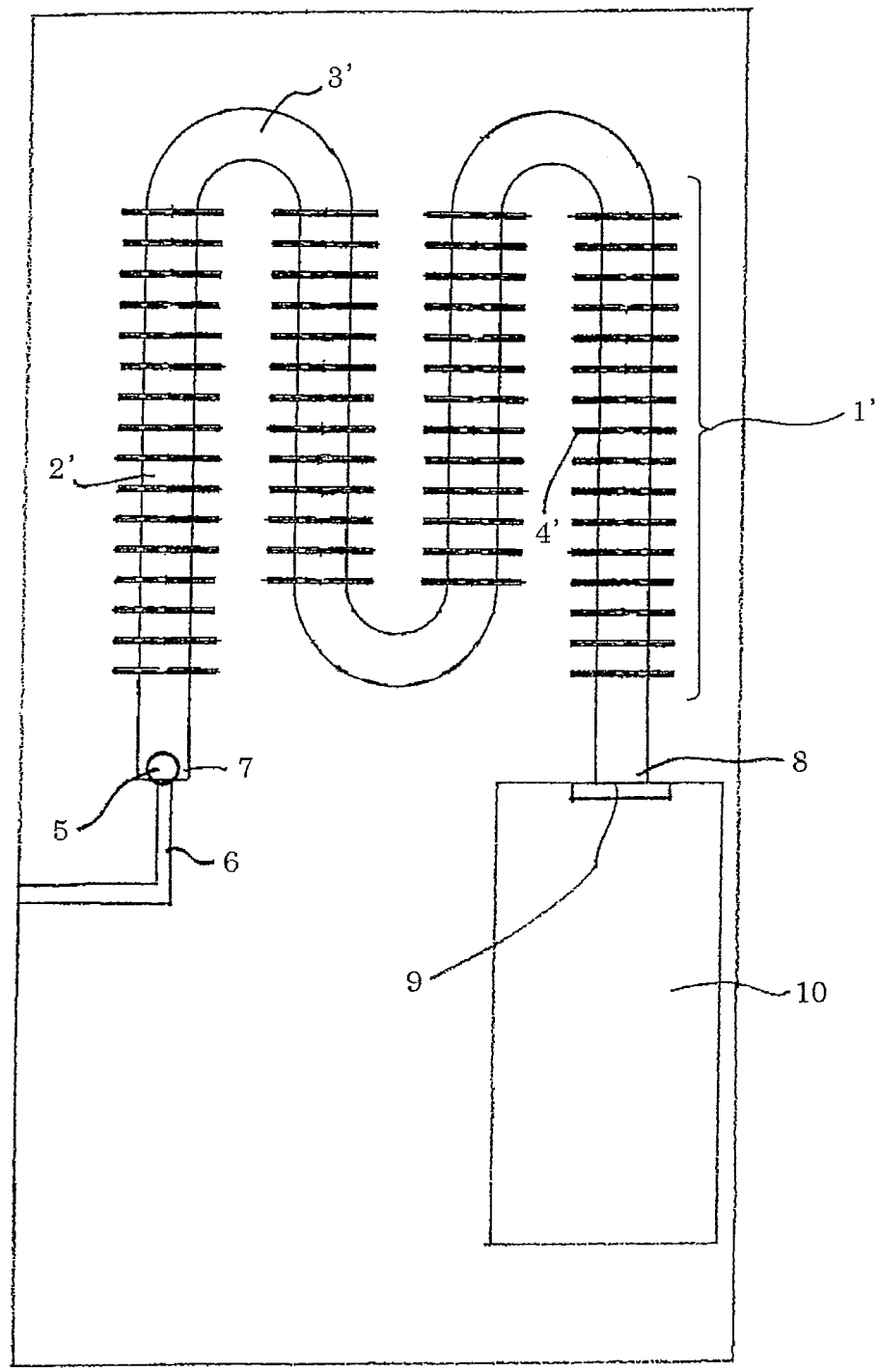
FIG. 9 is a view showing an example of a mold used in a manufacturing method of the present invention.

FIG. 9 is a view showing an example of a mold used in the present invention.

As shown in FIG. 9, the mold has a cavity 1' including straight portion cavities 2', curved portion cavities 3', and fin cavities 4' and having a shape following the outer shape of the heat exchanger unit.

An end 7 which is one end of the cavity is provided with a floating core 5 and a pressure port 6. The floating core 5 has a diameter corresponding to the inside diameter of the pipe. A pressurized fluid for pressing and moving the floating core 5 to the other end 8 of the cavity is pressure-injected through the pressure port 6.

The floating core 5 is provided in the cavity so that its back faces the pressure port 6, whereby the floating core 5 can be pressed by the pressurized fluid pressure-injected through the pressure port 6. The floating core 5 can be formed of a metal, such as copper, iron, aluminum, stainless, and steel, or can be formed of a resin. The shape of the floating core 5 is not limited to a spherical shape shown in FIG. 9, and the floating core 5 may have a conical shape, a bullet shape, or a hemispherical shape as long as the maximum diameter corresponds to the inner diameter of the pip.

The pressure port 6 is connected to a pressurized fluid system (not shown) for pressure-injecting/discharging a pressurized fluid. The pressure port 6 applies the pressurized fluid, supplied from the pressurized fluid system, to the back surface of the floating core 5 and presses and moves the floating core 5 to the other end 8 of the cavity. The pressurized fluid is pressure-injected through the pressure port 6 after the inside of the cavity is filled with a resin. A resin gate (not shown) is provided slightly away from the floating core 5 so that in the injection of the molten resin through the resin gate, while the floating core 5 is pressed against the pressure port 6 without floating, the inside of the cavity can be filled with the molten resin.

A communicating port 9 is provided on the other end 8 side of the cavity, and an excess resin storage cavity 10 is communicated with the cavity 1' through the communicating port 9. Although the communicating port 9 has a size allowing the passage of the floating core 5, it is preferable that the floating core 5 has a slightly constricted shape for the sake of ease of the following process such as cutting process. When the pressurized fluid is pressure-injected through the pressure port 6 in such a state that the cavity 1' is filled with a resin, an excess resin is extruded from the cavity 1' by moving the floating core 5. The excess resin storage cavity 10 has a capacity capable of satisfactorily storing the excess resin and the floating core 5.

Although the means that opens and closes the communicating port 9 is not limited especially, there is means that opens and closes the communicating port 9 by moving a receiving shaft forward and backward by means of, for example, hydraulic pressure. Specifically, the receiving shaft passes through substantially the central portion of the excess resin storage cavity 10 to be retractably inserted toward the communicating port 9. When the receiving shaft advances, the peripheral edge of the front end is in press contact with the peripheral wall of the communicating port 9 to close the communicating port 9. The receiving shaft advances and retracts, whereby the communicating port 9 is opened and closed. Alternatively, the communicating port can be opened and closed by, for example, oil pressure, using a simply slidably opening/closing bar or the like.

Next, a specific procedure of injection-molding using the mold shown in FIG. 9 will be described.

Figure 10:
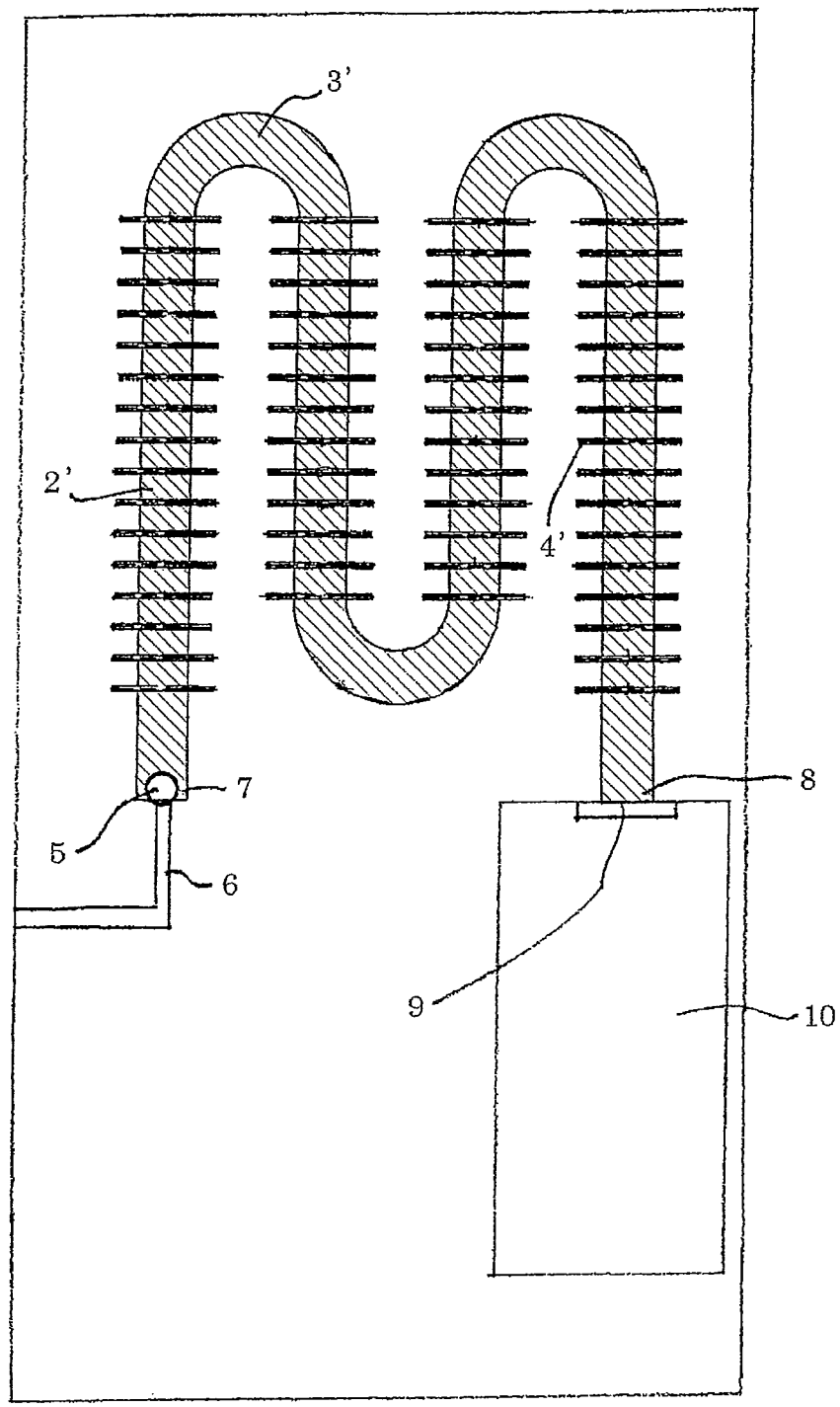
FIG. 10 is an explanatory view of the manufacturing method of the present invention and shows a state that a cavity is filled with a molten resin.

As shown in FIG. 10, a molten resin is first injected while the communicating port 9 is closed. The molten resin can be injected using a well-known injection molding apparatus.

Figure 11:
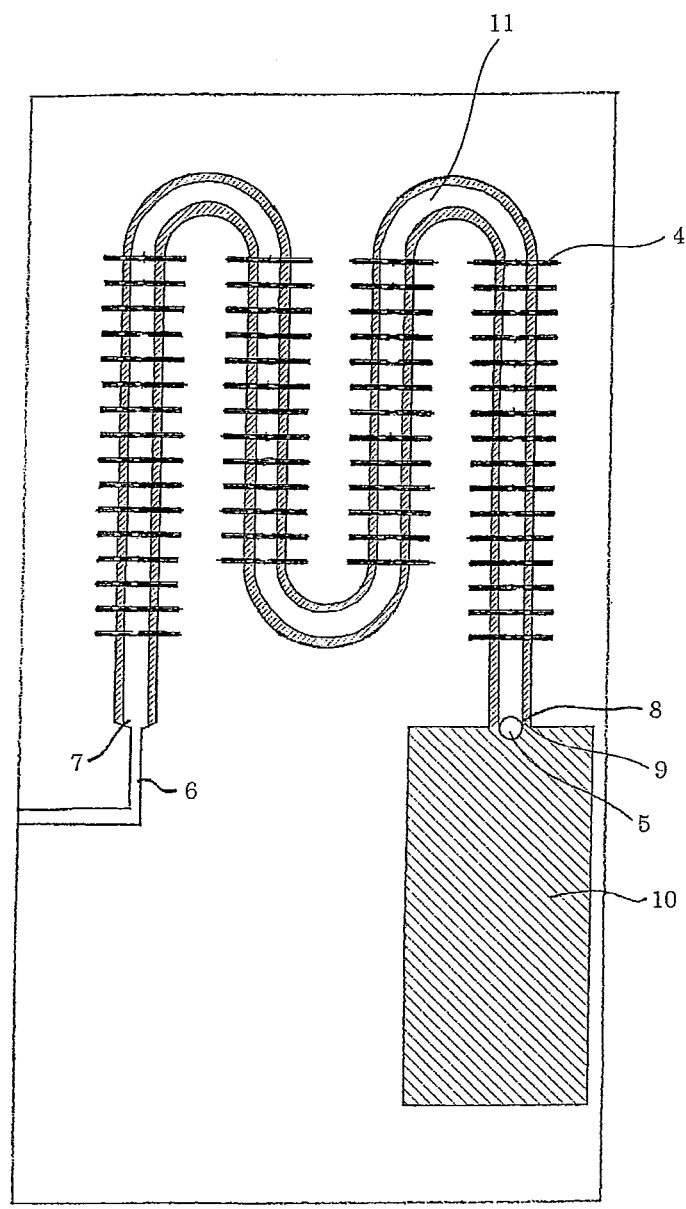
FIG. 11 is an explanatory view of the manufacturing method of the present invention and shows a state that a floating core is moved by pressure-injection of a pressurized fluid, and a resin is filled in a cavity for storing an excess resin.

Then, as shown in FIG. 11, the communicating port 9 is opened, and, at the same time, the pressurized fluid is pressure-injected through the pressure port 6. At that time, the floating core 5 advances toward the excess resin storage cavity 10 so as to push a slowly solidified molten resin of the center portion of the cavity into the excess resin storage cavity 10 through the communicating port 9, while remaining resin of the outer peripheral portion of the cavity, which starts to be solidified by cooling or heating. Eventually, the floating core 5 enters into the excess resin storage cavity 10, and the excess resin storage cavity 10 is filled with the resin pushed out through the communicating port 9. After the floating core 5 has passed through the cavity, a hollow 11 having a diameter substantially the same as the diameter of the floating core 5 is formed. Thus, the diameter of the hollow 11 can be adjusted by selecting the diameter of the floating core 5. The resin of a portion at which the hollow 11 is formed is pressed against the peripheral wall surface of the cavity by the pressure of the pressure-injected pressurized fluid, and the shape of the hollow 11 is maintained.

As the pressurized fluid, there is used a gas or liquid that does not react with or is not compatible with the resin to be used under injection-molding temperature and pressure conditions. Specifically, nitrogen gas, carbon dioxide gas, air, glycerin, liquid paraffin, and so on can be used; however, an inert gas including nitrogen gas is preferably used. In the pressure-injection of the pressurized fluid, for example when a gas such as nitrogen gas is used as the pressurized fluid, a pressurized gas as the pressurized fluid, whose pressure is raised by a compressor, is previously stored in an accumulator (not shown), and the pressurized gas is introduced into the pressure port 6 through a pipe, whereby the pressurized gas can be pressure-injected. Alternatively, the pressurized gas whose pressure is raised by a compressor is directly supplied to the pressure port 6, whereby the pressurized gas can be pressure-injected. Although the pressure of the pressurized gas supplied to the pressure port 6 is different depending on the kind of a resin to be used and the size of the floating core 5, it is usually approximately 4.90 to 29.42 MPa (50 to 300 kg/cm$^2$G).

Subsequently, preferably, the resin is cooled while maintaining the inner pressure in a mold, and the pressurized fluid in the hollow 11 is then discharged; thereafter, a molded product is removed. When a gas is used as the pressurized fluid, the pressurized fluid can be discharged by opening the pressure port 6 to the atmosphere. The pressurized fluid may be recovered into a recovery tank (not shown) for circulation utilization.

A secondary molded product (not shown) molded in the excess resin storage cavity 10 is separated from the removed molded product, whereby the resin heat exchanger unit of the present invention can be obtained. Although the secondary molded product can be easily separated by, for example, being cut near the communicating port, the communicating port 9 is previously formed into a constricted shape, whereby the secondary molded product can be more easily cut off to be separated.

EXAMPLES

Example 1

A resin heat exchanger unit of the following size shown in FIG. 1 is integrally molded by an injection machine ("TP-180H" from Toyo Machinery & Metal Co., Ltd.), using the mold shown in FIG. 9.

[Pipe]
Outer diameter: 10 mm
Inner diameter: 7 mm
Average thickness: 1.5 mm
Length of straight portion: 105 mm, 70 mm
Curved portion: R15 mm
[Fin]
Disk shape of 20 mmφ
Average thickness: 0.85 mm
Thickness of root: 1 mm
Thickness of front end: 0.65 mm
Number: 58 (4 fins/1 cm length of the pipe)

As the floating core, a steel ball with a diameter of 7 mm is used, and a gas generator for gas hollow injection-molding ("air mold" from Asahi Engineering CO., LTD) is used for the supply of a pressurized fluid. As the pressurized fluid, nitrogen gas is used. As a resin, a polyamide 66 resin ("LEONA 1300G from Asahi Kasei Chemicals Corporation) containing 33% by weight of glass fiber is used.

As shown in FIG. 10, the resin is injected at a resin temperature of 260° C. and an injection pressure of 11.77 MPa (120 kg/cm$^2$). After a lapse of 1 second from the completion of injection, nitrogen gas with a pressure of 22.56 MPa (230 kg/cm$^2$) is pressure-injected. Then, the floating core is moved in the mold as shown in FIG. 11. After the resin is cooled for 30 seconds, the resin heat exchanger unit shown in FIG. 1 is removed.

When hot water is flowed from one side of the pipe of the obtained heat exchanger unit to be discharged from the other side, the temperature of the discharged hot water is lowered by 1.5° C. ($\Delta T=1.5°$ C.), and thus the obtained heat exchanger unit satisfactorily serves as a heat exchanger. When the durability is tested under such conditions that the hot water at 80° C. is flowed for 1000 hours while being subjected to the inner pressure of 0.15 MPa (1.5 Kg/cm$^2$), the heat exchanger unit is highly durable as a heat exchanger without causing the increase of the resistance to flow, the occurrence of cracks, and so on.

When three resin heat exchanger units are joined through a header tank, $\Delta T=5°$ C., excellent performances as a heat exchanger are exhibited.

Example 2

A resin heat exchanger unit (similar to one shown in FIG. 4 except that an outer frame is not provided) is obtained in the same manner as for Example 1, except that each of the fins has a rectangular plate shape (18 mm×18 mm). The performances of the resin heat exchanger unit of Example 2 as a heat exchanger are substantially equivalent to Example 1, and the resin heat exchanger unit of Example 2 also exhibits excellent performances.

Example 3

A resin heat exchanger unit is obtained in the same manner as for Example 1, except that each of the fins has a rectangular plate-like shape, and the adjacent fins are continuously connected to each other (this resin heat exchanger unit is similar to one shown in FIG. 6, except that an outer frame is not provided). The obtained resin heat exchanger unit is highly durable, and ΔT=2° C.; thus, the obtained resin heat exchanger unit is excellent as a heat exchanger.

The invention claimed is:

1. A method for manufacturing a resin heat exchanger unit, comprising:
   injecting a molten resin into a pipe cavity of a mold, the pipe cavity having on its one end a pressure port provided with a floating core and on its other end and outlet;
   pressure-injecting a pressurized fluid through the pressure port after the injection of the molten resin; and
   moving the floating core to the outlet side, and, at the same time, extruding the molten resin from the outlet, so as to obtain the resin heat exchanger unit, wherein
   the resin heat exchanger unit comprises:
   a pipe formed of the resin and having straight portions and curved portions provided alternatively and continuously; and
   a plurality of fins formed of the resin and connected to the pipe, the pipe and the plurality of fins being integrally injection-molded.

2. The method for manufacturing a resin heat exchanger unit according to claim 1, wherein an average thickness of the fin is not less than Tp/20 and not more than Tp, wherein Tp is an average thickness of the pipe.

3. The method for manufacturing a resin heat exchanger unit according to claim 2, wherein the thickness of the front end of the fin is not less than Tr/10 and more than Tr, wherein Tr is the thickness of the portion of the fin in contact with the pipe).

4. The method for manufacturing a resin heat exchanger unit according to any one of claims 1 to 3, wherein the resin is a thermoplastic resin.

5. The method for manufacturing a resin heat exchanger unit according to claim 1, wherein the fin is perpendicular to the axial direction of the straight portion of the pipe.

6. The method for manufacturing a resin heat exchanger unit according to claim 1, wherein the resin heat exchanger unit further comprises an outer frame formed of a resin and integrally injection-molded with the pipe.

7. A method for manufacturing a resin heat exchanger comprising the step of joining a plurality of the resin heat exchanger units manufactured by the method of claim 1 through a header tank.

* * * * *